(12) United States Patent
Schlichter et al.

(10) Patent No.: US 9,233,326 B2
(45) Date of Patent: Jan. 12, 2016

(54) SEPARATING DEVICE COMPRISING A CYCLONE SEPARATING DEVICE

(75) Inventors: Bernhard Schlichter, Saarbrücken (DE); Ralf Wnuk, Bexbach/Kleinottweiler (DE); Thomas Böttcher, Illingen-Hüttigweiler (DE); Christoph Winter, Saarbrücken (DE); Klaus Kimmerle, Homburg (DE)

(73) Assignee: HYDAC PROCESS TECHNOLOGY GMBH, Neunkirchen (DE)

( * ) Notice: Subject to any disclaimer, the term of this patent is extended or adjusted under 35 U.S.C. 154(b) by 269 days.

(21) Appl. No.: 13/261,625

(22) PCT Filed: Sep. 28, 2011

(86) PCT No.: PCT/EP2011/004840
§ 371 (c)(1),
(2), (4) Date: May 23, 2013

(87) PCT Pub. No.: WO2012/045405
PCT Pub. Date: Apr. 12, 2012

(65) Prior Publication Data
US 2013/0232927 A1     Sep. 12, 2013

(30) Foreign Application Priority Data
Oct. 8, 2010 (DE) .......................... 10 2010 047 760

(51) Int. Cl.
| | |
|---|---|
| *B01D 50/00* | (2006.01) |
| *B01D 45/16* | (2006.01) |
| *B01D 45/12* | (2006.01) |
| *B01D 46/28* | (2006.01) |
| *B01D 46/40* | (2006.01) |

(Continued)

(52) U.S. Cl.
CPC ................ *B01D 45/16* (2013.01); *B01D 45/12* (2013.01); *B01D 46/28* (2013.01); *B01D 46/40* (2013.01); *B01D 50/002* (2013.01); *B04C 3/06* (2013.01); *A47L 9/1608* (2013.01)

(58) Field of Classification Search
CPC ...... B01D 45/16; B01D 50/002; B01D 45/12; B01D 45/08; B01D 46/40; B01D 46/28; A47L 9/1608; B04C 3/06
USPC ................ 55/318, 337, 320, 447, 459.1, 461, 55/428–433; 95/271; 210/787
See application file for complete search history.

(56) References Cited

U.S. PATENT DOCUMENTS

| | | |
|---|---|---|
| 3,807,142 A | 4/1974 | Rich et al. |
| 4,414,112 A | 11/1983 | Simpson et al. |

(Continued)

FOREIGN PATENT DOCUMENTS

| | | |
|---|---|---|
| DE | 35 25 485 A1 | 1/1987 |
| EP | 1 191 141 A | 3/2002 |

(Continued)

*Primary Examiner* — Dung H Bui
(74) *Attorney, Agent, or Firm* — Wenderoth, Lind & Ponack, L.L.P.

(57) ABSTRACT

A separating device for separating a multiphase medium includes a cyclone separating device (1) that provokes an at least partial distribution of at least two phases of the medium with the formation of a vortex flow for the medium. Each phase having a lower density compared to the other phase is separated from the other phase and can be guided out of the separating device by a collecting device (35, 37).

19 Claims, 5 Drawing Sheets

(51) Int. Cl.
  *B04C 3/06* (2006.01)
  *A47L 9/16* (2006.01)

(56) References Cited

U.S. PATENT DOCUMENTS

| | | | |
|---|---|---|---|
| 5,028,318 A * | 7/1991 | Aslin | 210/85 |
| 5,227,061 A | 7/1993 | Bedsole | |
| 5,566,835 A | 10/1996 | Grimes | |
| 6,119,870 A * | 9/2000 | Maciejewski et al. | 209/725 |
| 6,129,775 A | 10/2000 | Conrad et al. | |
| 7,169,305 B2 * | 1/2007 | Gomez | 210/512.3 |
| 8,617,405 B2 * | 12/2013 | Hopper | 210/787 |
| 2004/0256312 A1 * | 12/2004 | Gomez | 210/512.3 |
| 2007/0089609 A1 * | 4/2007 | Dou et al. | 96/208 |
| 2008/0251469 A1 * | 10/2008 | Tee et al. | 210/788 |
| 2010/0064893 A1 * | 3/2010 | Hopper | 95/271 |
| 2013/0327727 A1 * | 12/2013 | Hopper | 210/787 |

FOREIGN PATENT DOCUMENTS

| | | |
|---|---|---|
| JP | 08038944 A | 2/1996 |
| WO | WO 03/045525 A1 | 6/2003 |

\* cited by examiner

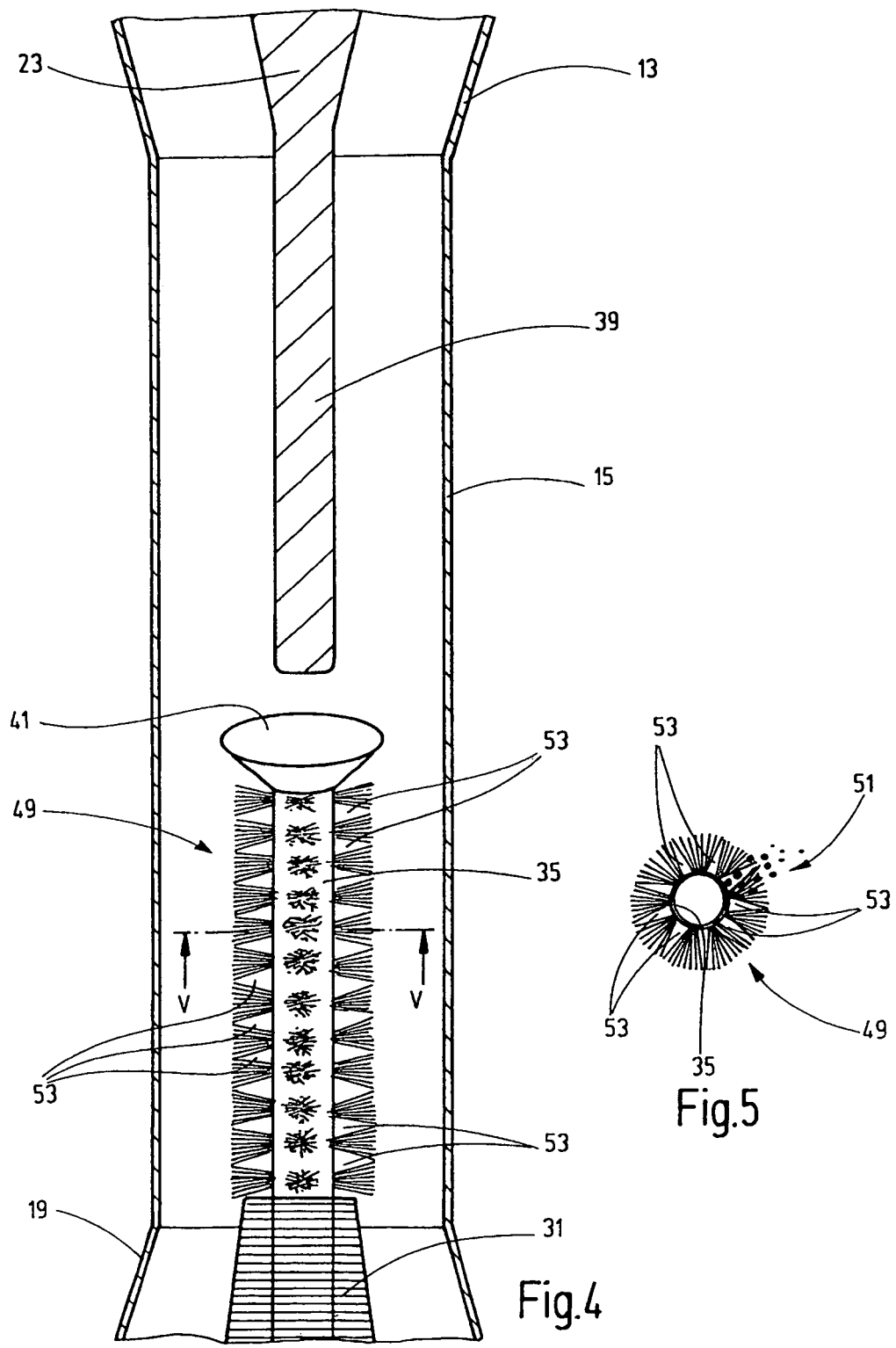

SEPARATING DEVICE COMPRISING A CYCLONE SEPARATING DEVICE

FIELD OF THE INVENTION

The invention relates to a separating device for separating a multiphase medium, comprising a cyclone separating device that causes an at least partial distribution of at least two phases of this medium with the formation of a vortex flow for the medium.

BACKGROUND OF THE INVENTION

Separating devices are prior art, see, for example, U.S. Pat. No. 6,129,775. These devices are used, for example, for separating media that in a liquid phase contain a second liquid phase (for example, aqueous phase/hydrocarbon phase) or a gaseous phase or suspended solids, or for media that in a gaseous phase contain a second gaseous phase and/or a liquid phase (for example, aqueous phase) and/or suspended solids.

SUMMARY OF THE INVENTION

An object of the invention is to provide an improved separating device characterized by especially favorable operating behavior when used to separate media with phases of different density.

This object is basically achieved according to the invention by a separating device where one phase, having a lower density than the other phase, is separated from this other phase and can be routed out of the separating device by a collecting device. Separation of the lighter phase from a liquid or gaseous phase especially advantageously allows hydrocarbon portions (oil) or gaseous components to be separated from an aqueous phase or media with gaseous phases to be separated into gases of different density.

In especially advantageous exemplary embodiments, the collecting device for the lower density phase has at least one discharge pipe that, with at least one collection opening, discharges in the cyclone separating device in a zone in which the lower density phase is separated by the vortex flow. Placing the mouth of a discharge pipe of the collecting device in a zone in which separation of the lighter phase is effected by the flow, which is both centrifugally active and which also extends axially, yields a suction action within the discharge pipe. In the simplest construction, the collecting device then forms a suction device for the lighter phase so that an especially simple structure can be implemented for the entire device.

The suctioning-off of the lighter phase is made especially efficient when a widening increases the inlet cross section of the collection opening at the end of the respective discharge pipe.

The widening can be especially advantageously formed by a conical intake funnel.

The outer edge of the intake funnel can project radially above the wall of the discharge pipe.

Alternatively, the intake funnel can be formed within the wall thickness of the discharge pipe, which in this case has a correspondingly larger sufficient wall thickness. For an intake funnel integrated into the discharge pipe in this way, the advantage arises that the flow running upward on the outside of the pipe cannot be hampered by a funnel projecting above the outside of the pipe.

For a funnel integrated into the pipe wall, in the wall of the discharge pipe openings can be formed that lead into the interior of the intake funnel. Additional inlet cross sections for the lighter phase to be exhausted are then formed.

To produce a coalescing effect in the flow running along the outside of the discharge pipe, contouring can be on the outside of the wall of the discharge pipe. For this purpose, grooves or ribs can extend in the longitudinal direction or in helical lines. With respect to the coalescing action, contouring by bristles located on the outside of the pipe has proven especially effective, for example, by a round brush or spiral brush forming the contouring. Alternatively, an oleophobic coating can be on the outside of the pipe.

In especially advantageous exemplary embodiments, the cyclone separating device has a cyclone housing that defines a longitudinal axis with a housing inlet for inflow of the multiphase medium into a cyclone dome and has a space that adjoins the dome along the longitudinal axis and that has the collecting device for the lower density phase and housing outlets for other phases. The discharge pipe extends in the middle along the longitudinal axis within the space.

Especially advantageously, proceeding from the cyclone dome, a flow body can extend along the longitudinal axis as far as the end region of the discharge pipe. Here, the end of the flow body facing the discharge pipe can have the shape of a cylindrical body, for example, with a diameter similar to or equal to the diameter of the discharge pipe. This cylindrical body stabilizes the flow of the lighter phase.

On the end of this cylindrical body, a wedge-wire screen or a metal fabric can extend into the funnel-like widening of the discharge pipe to develop an additional coalescing action for the lighter phase.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 4 is a partial side view in section of a middle longitudinal section of a cyclone separating device according to a fourth exemplary embodiment of the invention;

FIG. 5 is a partial end view in section take along line V-V of FIG. 4; and

DETAILED DESCRIPTION OF THE INVENTION

Figure 1:
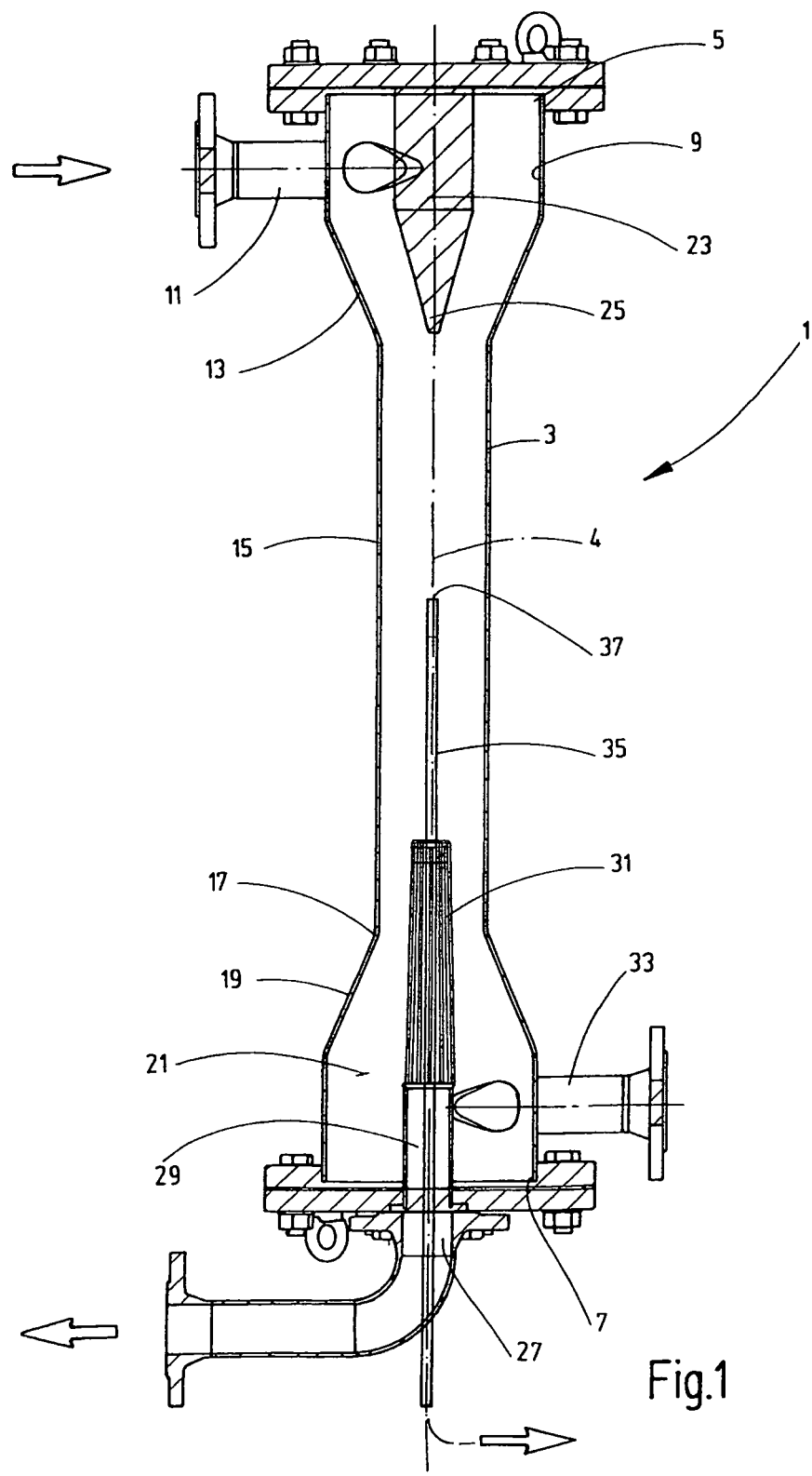
FIG. 1 is a side view in section of a cyclone separating device according to a first exemplary embodiment of a separating device according to the invention.

In FIG. 1, a cyclone separating device has its cyclone housing 3 extending vertically, with respect to a longitudinal axis 4 and having an elongated shape. The cyclone housing 3 is closed on the top end 5 and on the bottom end 7. The top end 5 forms a cyclone dome 9 into whose drum-like interior a multiphase medium can flow via a housing inlet 11 for phase separation. In the manner that is conventional for cyclone separators, the housing inlet 11 is arranged such that the medium flows in tangentially with respect to the wall of the cyclone dome 9 to form a vortex flow. The cylindrical cyclone dome 9 adjoins a cone part 13 with walls that converge downward, in which the vortex flow, with a flow velocity that is altered according to geometrical conditions, continues into an elongated cylindrical intermediate part 15. Cone part 13 is tapered relative to the cyclone dome 9. The lower end 17 of intermediate part 15 is in turn adjoined by a cone part 19 with walls that diverge downward and merge into a cylindrical bottom chamber 21 whose diameter corresponds to that of the cyclone dome 9. Chamber 21 is closed on the bottom end 7. The diameter of the cyclone dome 9 can be larger.

From the top end 5, proceeding from the cyclone dome 9, a flow body 23 extends downward in the form of a body of revolution that is coaxial to the longitudinal axis 4. In the example shown in FIG. 1, the flow body 23 in its free end region forms a guide body 25 in the form of a cone extending within the cone part 13. The cone conicity is chosen such that the transition site between the cone part 13 and the housing part 15 has a certain cross-sectional narrowing, as a result of which the flow velocity of the partial flow entering the cylindrical part 15 is uniformly accelerated up to the end of the cone and the centrifugal flow is directed. The centrifugal action of the axial flow causes separation of the phase that is "lighter" at the time within the cylindrical housing part 15.

In the zone of separation of the "lighter" phase, which zone is located within the cylindrical housing part 15, the collecting device for delivery of this phase is detailed below. For the discharge of the conversely "heavier" phases from the bottom chamber 21, on its bottom is a housing outlet 27 with a pipe socket 29 that projects into the bottom chamber 21 and that is coaxial to the axis 4. From the end of pipe socket 29, filter cartridge-like, conical wedge-wire pipe screen filter element 31 extends beyond the cone part 19 into the cylindrical housing part 15. When the flow passes through the filter element 31, which flow passes through filter element 31 from the outside to the inside, the solids are separated from the remaining denser liquid or gaseous phase so that solid-free liquid or solid-free gas emerges from the housing outlet 27. Solids that have been deposited on the outside of the filter element 31 and that sink or drop into the bottom chamber 21 are intermittently exhausted via another housing outlet 33. As FIG. 1 shows, this housing outlet 33 forms a discharge point that extends tangentially to the wall of the bottom chamber 21, similarly to the tangential entry point of the housing inlet 11 on the top end 5, but the discharge point at the housing outlet 33 works in the opposite direction relative thereto. Instead of a wedge-wire pipe screen filter element 31, a mesh fabric or the like can be provided.

The collecting device for the separated, respective "lighter" phase has a discharge pipe 35. Discharge pipe 35 extends from the outside of the cyclone housing 3 through the housing outlet 27 of the bottom chamber 21, through the pipe socket 29 and the inner filter cavity of the filter element 31, which cavity is fluid-connected to the pipe socket, and into the middle along the longitudinal axis 4 as far as the central region of the cylindrical housing part 15 where the zone of the separated "lighter" phase is located. The open end of the discharge pipe 35 forms the collection opening 37 for the outflow of the separated phase. For the geometry of the cyclone housing 3 shown in FIG. 1, where the vortex flow in the cylindrical housing part 15 moves axially downward until flow reversal takes place, and where a secondary flow that rises along the outside of the discharge pipe 35 arises, a strong negative pressure prevails in the separation zone. That is, in the region of the collection opening 37 of the discharge pipe 35 and in the center of the vortex flow, as a result of which a strong suction action forms in the discharge pipe 35. At an axial velocity of from about 0.1 m/s to 0.4 m/s that is pointed downward in operation above the collection opening 37 in the cylindrical housing part 15 and for a secondary flow that rises along the discharge pipe 35 with an axial velocity of about 1 m/s, a flow velocity within the discharge pipe 35 downward can be established in the range of about 10 m/s. The discharge pipe 35 then forms an effective exhaust apparatus for the lighter phase. In practical exemplary embodiments, the inside diameter of the discharge pipe 35 can be about 4 mm, with an inside diameter of the cylindrical housing part 15 of about 65 mm. This rising secondary flow is preferably formed from components of the light phase.

Figure 2:
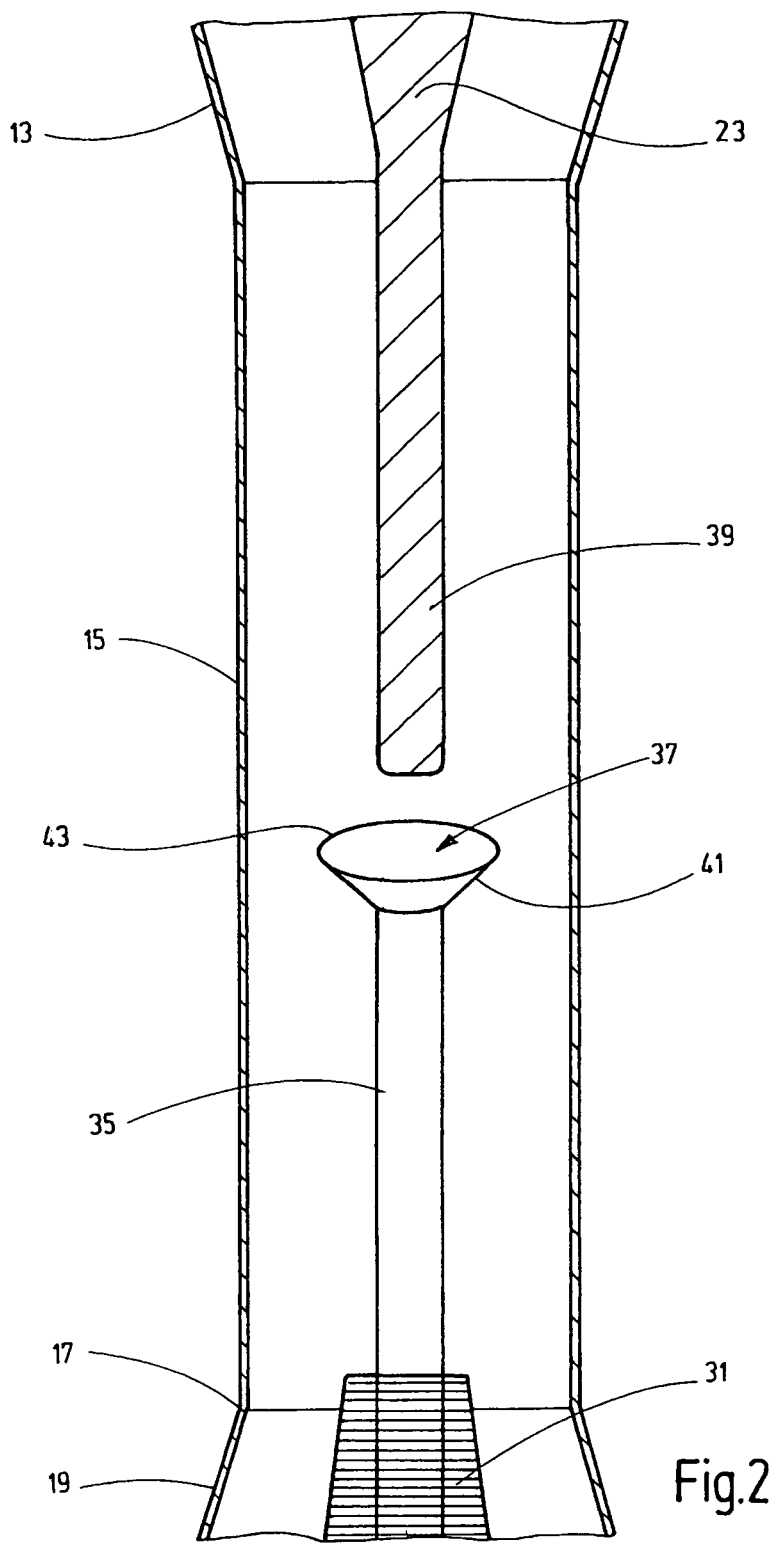
FIG. 2 is a partial side view in section of only the middle longitudinal section of a cyclone separating device, which partial section is shown broken away and enlarged relative to FIG. 1, according to a second exemplary embodiment of the invention.

FIG. 2 shows an exemplary embodiment that is modified relative to and that differs from FIG. 1 in that the flow body 23, instead of a shorter, end-side cone part 25, has an elongated cylindrical flow guide body 39. Moreover, on the end of the discharge pipe 35 is a widening that enlarges the inlet cross section of the collection opening 37 and that is formed by a conical intake funnel 41. The funnel 41 in the example of FIG. 2 is dimensioned such that the diameter on the outer funnel edge 43 that projects radially above the discharge pipe 35 is about six times the inside diameter of the discharge pipe 35. This execution ensures especially effective exhaust of the separated lower density phase.

Figure 3:
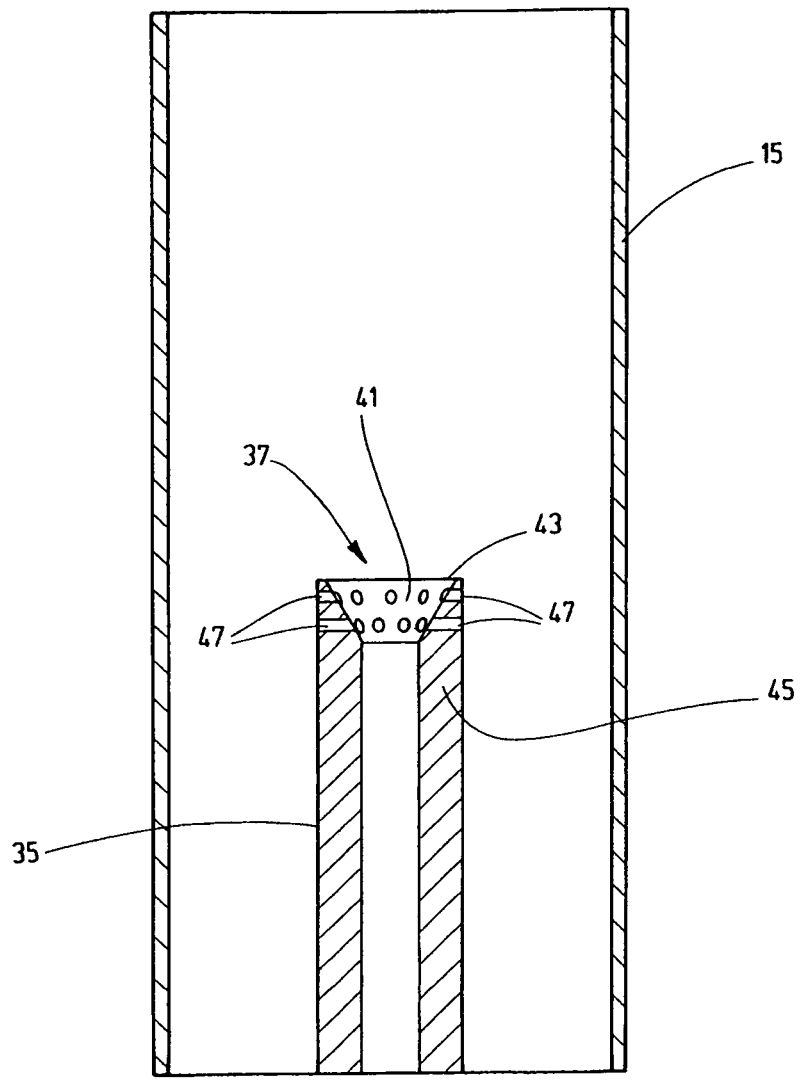
FIG. 3 is an enlarged partial side view in section of a central section of a cyclone housing according to a third exemplary embodiment of the invention.

FIG. 3 illustrates one version of the configuration of the discharge pipe 35 and its intake funnel 41. Instead of a fitted funnel with an edge that projects radially above the outside of the discharge pipe 35, the funnel 41 is integrated into the pipe wall 45 of the discharge pipe 35, which is made correspondingly thick-walled in this case. In this exemplary embodiment, in addition to the advantage of the inlet cross section of the discharge pipe 35, which cross section has been widened in the form of a funnel, the further advantage is provided that no radially projecting funnel edge 43 is present around which the secondary flow that flows upward along the outside of the discharge pipe 35 must flow. As is shown in FIG. 3, in the pipe wall 45 of the discharge pipe 35, radial bores 47 are formed that lead into the interior of the funnel 41, and thus, further enlarge the inlet cross section for the flow into the interior of the discharge pipe 35. This funnel 41 can also be made from a metal fabric.

The outside of the discharge pipe 35 can be used to have a coalescing action on the secondary flow that is rising on it. For this purpose, the outside of the discharge pipe 35 can be provided with contouring or with an oleophobic coating for coalescing of oil, for example. FIGS. 4 and 5 illustrate an example in which for this purpose bristles of a brush body 49 surround the discharge pipe 35. The brush body 49 can be formed in this connection by a brush roll, by individual round brushes or spiral brushes. As suggested in FIG. 5 with oil droplets 51, coalescing takes place when the brush penetrates from the outside to the inside, and the outflow can take place within the gusset 53 (not all numbered).

Instead of contouring by the brush body 49 on the outside of the discharge pipe 35, grooves, ribs, or the like can be used.

Figure 6:
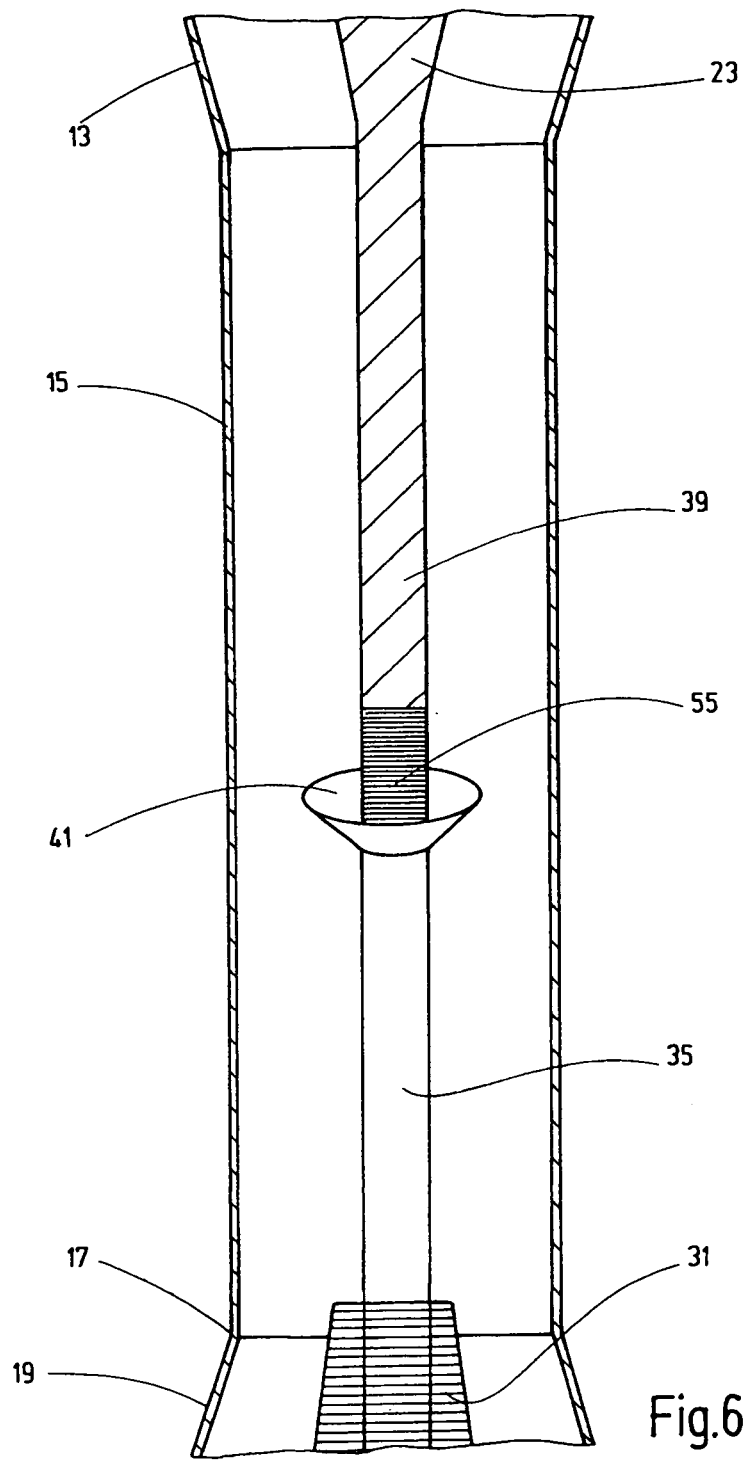
FIG. 6 is a partial side view in section of a middle longitudinal section of a cyclone separating device according to a fifth exemplary embodiment of the invention.

FIG. 6 shows another example similar to the example of FIG. 2, aside from the fact that the free end of the flow guide body 39 is adjoined by a wedge-wire screen 55 that extends into the interior of the funnel 41. At a fineness of, for example, 500 μm, the screen 55 forms an additional coalescing zone within the exhaust zone for the phases of the respective lower density. All flows within the housing of the device move along a vortex flow that points in the same direction. In particular, the lighter phase, which rises up opposite the other vortex flow within the housing of the device along the discharge pipe 35, has the same vortex direction so that no interference superpositions occur within the fluid flow.

While various embodiments have been chosen to illustrate the invention, it will be understood by those skilled in the art that various changes and modifications can be made therein without departing from the scope of the invention as defined in the appended claims.

The invention claimed is:

1. A separating device for separating a multiphase medium, comprising:
   a cyclone separating device that causes an at least partial distribution of at least first and second phases of the multiphase medium and forms a vortex flow of the multiphase medium, said first phase having a lower density relative to said second phase; and
   a collecting device in said separating device separating said first phase from said second phase and conveying said first phase out of said separating device, said collecting device having at least one discharge pipe having contouring on an outside of a wall of said discharge pipe, said contouring including at least one of a brush or grooves.

2. A separating device according to claim 1 wherein said contouring comprises a round brush.

3. A separating device according to claim 1 wherein said contouring comprises a spiral brush.

4. A separating device according to claim 1 wherein said discharge pipe comprises at least one collection opening discharging in said separating device in a zone in which said first phase is separated by the vortex flow.

5. A separating device according to claim 4 wherein a widening increases an inlet cross section of said collection opening at an end of said discharge pipe.

6. A separating device according to claim 5 wherein said widening comprises a conical intake funnel.

7. A separating device according to claim 6 wherein said intake funnel comprises an outer edge projecting radially from said wall of said discharge pipe.

8. A separating device according to claim 6 wherein said intake funnel is within a wall thickness of said discharge pipe without extending radially therefrom.

9. A separating device according to claim 8 wherein said discharge pipe comprises openings extending radially through said wall of said discharge pipe leading into an interior of said intake funnel.

10. A separating device according to claim 1 wherein said separating device comprises a cyclone housing defining a longitudinal axis, a housing inlet for inflow of the multiphase medium, a cyclone dome receiving the inflow from said housing inlet, a space adjoining said cyclone dome along said longitudinal axis, and housing outlets for other phases; and
    said discharge pipe extends in a middle of said cyclone housing along said longitudinal axis within said space.

11. A separating device according to claim 10 wherein a flow body extends from said cyclone dome along said longitudinal axis as far as an end region of said discharge pipe.

12. A separating device according to claim 11 wherein a wedge-wine screen is on said flow body and extends into a funnel-shape widening of said discharge pipe.

13. A separating device for separating a multiphase medium, comprising:
    a cyclone separating device that causes an at least partial distribution of at least first and second phases of the multiphase medium and forms a vortex flow of the multiphase medium, said first phase having a lower density relative to said second phase, said separating device having a cyclone housing with a longitudinal axis and a cyclone dome;
    a collecting device in said separating device separating said first phase from said second phase and conveying said first phase out of said separating device, said collecting device having a discharge pipe with an intake funnel at a collection opening on an end of said discharge pipe;
    a flow body extending from said cyclone dome and along said longitudinal axis; and
    a wedge-wire screen extending from an end of said flow body into said intake funnel.

14. A separating device according to claim 13 wherein said collection opening discharges in said separating device in a zone in which said first phase is separated by the vortex flow.

15. A separating device according to claim 13 wherein said intake funnel is conical.

16. A separating device according to claim 13 wherein said intake funnel comprises an outer-edge projecting radially from a wall of said discharge pipe.

17. A separating device for separating a multiphase medium, comprising:
    a cyclone separating device that causes an at least partial distribution of at least first and second phases of the multiphase medium and forms a vortex flow of the multiphase medium, said first phase having a lower density relative to said second phase; and
    a collecting device in said separating device separating said first phase from said second phase and conveying said first phase out of said separating device, said collecting device including a discharge pipe with a collection opening in said separating device and with an intake funnel increasing an inlet cross-section of said collection opening at an end of said discharge pipe in said separating device, said intake funnel being formed within a wall thickness of said discharge pipe without extending radially outwardly therefrom.

18. A separating device according to claim 17 wherein said discharge pipe comprises openings extending radially through said wall thickness of said discharge pipe leading into an interior of said intake funnel.

19. A separating device according to claim 17 wherein said intake funnel has a conical inner surface.

* * * * *